United States Patent
Wingo et al.

(10) Patent No.: US 8,503,405 B1
(45) Date of Patent: Aug. 6, 2013

(54) VARIATION IN SESSION SETUP MODE BASED ON LATENCY OF TARGET DEVICE

(75) Inventors: Louie E. Wingo, Liberty, MO (US); Harry H. Lai, Overland Park, KS (US); Cesar Perez, Olathe, KS (US); John D. Sumler, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 260 days.

(21) Appl. No.: 13/006,130

(22) Filed: Jan. 13, 2011

(51) Int. Cl.
*H04B 7/216* (2006.01)

(52) U.S. Cl.
USPC .......................................................... 370/335

(58) Field of Classification Search
USPC ......... 370/328–339, 352–356, 395.5–395.52, 370/400–401; 455/422.1–426.2, 517–519
See application file for complete search history.

(56) References Cited

U.S. PATENT DOCUMENTS

| | | | |
|---|---|---|---|
| 6,725,053 B2 * | 4/2004 | Rosen et al. ................. | 455/518 |
| 6,865,398 B2 * | 3/2005 | Mangal et al. .............. | 455/552.1 |
| 7,043,266 B2 * | 5/2006 | Chaturvedi et al. .......... | 455/519 |
| 7,089,027 B1 | 8/2006 | Welch et al. | |
| 7,768,998 B1 | 8/2010 | Everson et al. | |
| 7,853,278 B2 * | 12/2010 | Hayashi et al. ............... | 455/518 |
| 8,249,078 B1 * | 8/2012 | Hassan et al. ............ | 370/395.21 |
| 2002/0173325 A1 * | 11/2002 | Rosen et al. .................. | 455/518 |
| 2005/0096059 A1 * | 5/2005 | Jiang et al. .................... | 455/450 |
| 2006/0084457 A1 | 4/2006 | Laha et al. | |
| 2007/0298823 A1 | 12/2007 | Sherif et al. | |

OTHER PUBLICATIONS

Office Action from U.S. Appl. No. 12/619,391, dated Dec. 16, 2011.

* cited by examiner

*Primary Examiner* — Frank Duong

(57) ABSTRACT

A method and corresponding device are disclosed for varying setup mode based on reported latency at a target device. The target device or its serving network may report a latency characteristic associated with the target device, such as an indication of the air interface protocol and/or slot cycle being used by the target device, and an initiating device or communication server may use the reported latency as a basis to decide whether to operate in (i) a normal setup mode when setting up a communication session with the target device or (ii) an optimistic setup mode when setting up a communication session with the target device.

18 Claims, 7 Drawing Sheets

VARIATION IN SESSION SETUP MODE BASED ON LATENCY OF TARGET DEVICE

BACKGROUND

A typical cellular wireless communication system provides numerous wireless coverage areas in which served wireless communication devices (WCDs) can operate. Each wireless coverage area may be defined by radio frequency radiation from a respective cellular base station, and each base station, together with additional network infrastructure, may provide connectivity with one or more transport networks such as the public switched telephone network (PSTN) and the Internet. With this arrangement, a WCD that is positioned within a given wireless coverage area may be served by the base station defining that coverage area and may thereby engage in communication, via that base station and perhaps additional network infrastructure, with one or more other WCDs, network servers, and other entities.

Aside from possibly allowing WCDs to thereby engage in conventional wireless telephone calls with each other, modern cellular wireless systems also enable WCDs to engage in real-time packet-based communication, such as voice-over-IP (VoIP) communication, with each other. To engage in such communication, each WCD may acquire a wireless packet data connection with its serving base station, and the WCDs may then engage in packet-based session setup signaling to set up a session.

A packet-based real-time media session between two WCDs can be set up and conducted in a peer-to-peer manner, where the WCDs exchange session setup signaling with each other to agree on session parameters, and the WCDs then exchange packet-based media (e.g., VoIP) with each other. Alternatively, a packet-based real-time media session between two or more WCDs can be set up and conducted via a call server that effectively functions as a bridge between the WCDs. In either case, the signaling used to set up the session may be packet-based signaling in accordance with the well known Session Initiation Protocol (SIP) for instance, and the WCDs may exchange packet-based real-time media with each other in accordance with a protocol such as the well known Real-time Transport Protocol (RTP) for instance. Alternatively, other protocols could be used.

In a server based arrangement, for example, a given WCD may initiate a session with one or more other WCDs by sending a SIP "INVITE" message via the given WCD's base station and other network infrastructure to a call server situated on a packet-switched network. The SIP INVITE message may designate the target WCDs individually or by a group ID number that the call server can correlate with the target WCDs, or the SIP INVITE message may not identify any target, in which case the call server may perform a database lookup to identify one or more WCDs that are preset as "buddies" of the initiating WCD and thus should be treated as target(s) for the requested session.

Upon receipt of the SIP INVITE from the initiating WCD, the call server may then itself send a SIP INVITE to each target WCD. In turn, upon receipt of the SIP INVITE, each target WCD may respond to the call server with a SIP "OK" message signaling acceptance of the invitation from the call server, and the call server may likewise respond to the initiating WCD with a SIP OK signaling acceptance of the invitation from the initiating WCD. After perhaps additional signaling, such as exchange of SIP "ACK" messages, an RTP leg would be established (i) between the initiating WCD and the call server and (ii) between the call server and each target WCD. The call server may then bridge those RTP legs together in order to allow the WCDs to communicate with each other.

This type of process can be used to set up VoIP conference calls or other type of packet-based real time media sessions (e.g., video calls, etc.) between WCDs. Further, the process can be used to facilitate "instant connect" cellular communication, such as push-to-talk (PTT), push-to-view (PTV) or similar communications, generally referred to as Push-to-X over cellular or PoC communications.

In practice, for instance, a user of a WCD may direct the WCD to initiate a PoC session or the like with at least one target WCD, and the user's WCD may then responsively engage in SIP signaling or the like to set up the session. Once the user's WCD receives a signal indicating that the session is set up, such as a SIPO OK for instance, the WCD may then emit an audible alert such as a "chirp" sound to a user as a prompt for the user to begin talking (or providing other real-time media for that matter). The WCD may then receive speech from the user, digitize and packetize the speech, and send the packetized speech via the established session for transmission to each target WCD.

OVERVIEW

When setting up a PoC session or other packet-based real-time media session with a target WCD, a significant latency issue can arise if the target WCD does not currently have an active wireless packet-data connection through which to engage in packet-based session setup signaling such as SIP signaling. This can occur, for instance, if the WCD is in a "dormant" state in which it has an assigned network address (e.g., IP address) but does not currently have a radio link over which packets destined to that address can be sent.

A target WCD can become dormant after a threshold period of inactivity. In particular, if no packet-data flows to or from the WCD for a threshold period of time, the radio network serving the WCD may responsively release a radio link that had been assigned to the WCD, thus transitioning the WCD from an active state to a dormant state. In the dormant state, the WCD would still have a network address to which packet-data (such as a SIP INVITE) can be destined, but the WCD would lack a radio link over which that communication can occur. In that state, if the radio network receives packet-data destined to the WCD, the network would typically hold the packet-data while the network arranges to transition the WCD from the dormant state back to the active state. In particular, the network would typically page the WCD over an air interface paging channel and await a response from the WCD. Once the WCD responds to the page, the network may then assign a new radio link to the WCD, at which point the network may then transmit the held packet-data to the WCD over that radio link.

Overall, this process of holding packet-data until a WCD transitions from the dormant mode to the active mode can be a significant source of session setup latency.

The extent of this "wakeup" latency can vary depending on a number of factors, one of which is how quickly the radio network can successfully page the target WCD. In this regard, a WCD and its serving radio network may be arranged to operate according to a paging "slot cycle" that defines how often the WCD will scan a paging channel for page messages and thus when the radio network should page the WCD. In general, use of a shorter slot cycle may result in less wakeup latency, as the WCD may more quickly receive a page message from the radio network and may thus more quickly acquire a wireless packet-data connection through which to receive packet-based session setup signaling. On the other hand, use of a longer slot cycle may result on more wakeup latency, as the WCD may have to wait longer before receiving a page message from the radio network and may thus take longer to acquire a wireless packet-data connection through which to receive packet-based session setup signaling.

In practice, a WCD and its serving radio network will operate according to an agreed air interface protocol, such as CDMA 1xRTT, CDMA 1xEV-DO, WiMAX, LTE, IDEN, GSM, HSPA, or another protocol now known or later developed, and the protocol may specify a default slot cycle and perhaps allow for negotiated use of a different agreed slot cycle. Consequently, the slot cycle and associated level of wakeup latency may vary from protocol to protocol and may vary on a case by case basis within a given protocol.

By way of example, a typical implementation of the 1xRTT protocol defines a default slot cycle of 5.12 seconds, which means that a served WCD would wait 5.12 seconds between instances of scanning for a page. On the other hand, a typical implementation of the higher-speed 1xEV-DO protocol defines a default slot cycle of 213 milliseconds, which means that a served WCD would wait 213 milliseconds between instances of scanning for a page. In practice, 1xEV-DO will tend to provide much lower wakeup latency than 1xRTT. Further, under at least 1xRTT, a WCD and serving network may negotiate for use of shorter slot cycle, such as 2.56 seconds or 1.28 seconds for instance, which could reduce the extent of wakeup latency under 1xRTT. Other examples are possible as well.

Many WCDs today are equipped to operate under multiple air interface protocols and/or to operate with various paging slot cycles. The air interface protocol and paging slot cycle used by such a WCD may vary based on numerous factors, such as where the WCD is located and what applications the WCD is running for instance. Therefore, the wakeup latency associated with a given WCD may vary from time to time, as various factors change.

For example, a WCD may be equipped to support both 1xEV-DO and 1xRTT. When such a WCD is in an area where 1xEV-DO coverage is available, the device may operate in accordance with 1xEV-DO and may have relatively low latency as described above. However, when the WCD moves from into an area where 1xEV-DO coverage is unavailable but 1xRTT coverage is available, the device may instead operate in accordance with 1xRTT and may have relatively high latency as described above. Further, the device may negotiate with its serving radio network to use a different a slot cycle, which may additionally impact its associated latency. Similar variation in latency may occur with other air interface protocols or in other scenarios as well.

There are several ways to help mitigate the latency that can arise in setup of a PoC session or other packet-based real-time media session.

One technique is for the initiating device to operate in an "optimistic talk permit" mode in which the initiating device prompts its user to begin talking before the initiating device has received acceptance of its session initiation request. For instance, in response to the user's request to initiate a PoC session, the initiating device may send a SIP INVITE message into the network and may then play an audible alert to prompt the user to begin speaking even though the device has not yet received a SIP OK indicating acceptance of its initiation request. As the initiating user may then start talking before the initiating device has an RTP session through which to transmit the speech, the initiating device may then buffer the user's speech for subsequent transmission. Advantageously, this optimistic talk permit mode makes it seem to the initiating user that the session is established very quickly. Further, the actual delay in transmitting the initiating user's speech is largely transparent to the target user since the session does not effectively begin from the target user's perspective until the speech arrives at the target device.

Another technique to help mitigate latency, in a server based system, is for the server to accept the initiating device's session initiation request without waiting to first receive an acceptance from the target device. For instance, once the server receives a SIP INVITE from the initiating device, the server may send a SIP OK to the initiating device before the server receives a SIP OK from the target device, and perhaps even before the server sends a SIP INVITE to the target device. This process can result in setup of the initiating leg of the conference more quickly, thus likewise giving the initiating user a perception of low-latency operation. In practice, with this process, the server itself may then need to buffer the initiating user's speech if the server does not yet have a session through which to send the speech to the target device. However, this delay in transmission of the user's speech may likewise be largely transparent to the target user.

These mitigating processes can be particularly useful when the target device has relatively high latency, but the processes may not be as useful when the target device has relatively low latency. Therefore, disclosed herein is a method for using the target device latency as a basis to select one or another session setup mode to use when establishing a packet-based real-time media session with the target device.

In accordance with the method, a first device will receive a report specifying a latency characteristic of a second device with which the first device will establish a packet-based real-time media session. The latency characteristic specified by the report preferably represents an air interface protocol being used by the second device and/or a paging slot cycle being used by the second device and thus corresponds with a level of wakeup latency that the device may experience. Based on the latency characteristic specified by the received report, the first device will then decide whether to operate (i) in a normal setup mode when establishing the session with the second device or (ii) in an optimistic setup mode when establishing the session with the second device. And the first device will then operate in the selected mode when establishing the session with the second device.

In practice, the first device can be an initiating device operated by an initiating user who will talk in the session, and the act of operating in the selected mode can involve sending a session initiation message (e.g., to the second device or to a communication server) to request initiation of the session. In that case, the act of operating in the normal setup mode may involve waiting to receive an acceptance of the sent session initiation message before alerting the user to begin talking. On the other hand, the act of operating in the optimistic setup mode may involve alerting the user to begin talking before the first device receives an acceptance of the sent session initiation message, and buffering speech received from the user in response to the alerting, for transmission of the speech once the session is set up.

As another example, in a server based system, the first device can be a communication server that bridges communication between an initiating end-user device and the second device, and the act of operating in the selected mode can involve receiving a first session initiation message from the initiating end-user device and, responsive to that message, sending a second session initiation message to the second device to request initiation of the session. In that case, the act of operating in the normal setup mode may involve waiting to receive from the second device an acceptance of the second session initiation message before sending to the initiating end-user device an acceptance of the first session initiation message. On the other hand, the act of operating in the optimistic setup mode may involve sending to the initiating end-user device an acceptance of the first session initiation message without first receiving from the second device an acceptance of the second session initiation message (and possibly before even sending the second session initiation message).

These as well as other aspects, advantages and alternatives will become more apparent to those of ordinary skill in the art by reading the following detailed description, with reference where appropriate to the accompanying drawings.

DETAILED DESCRIPTION

Figure 1:
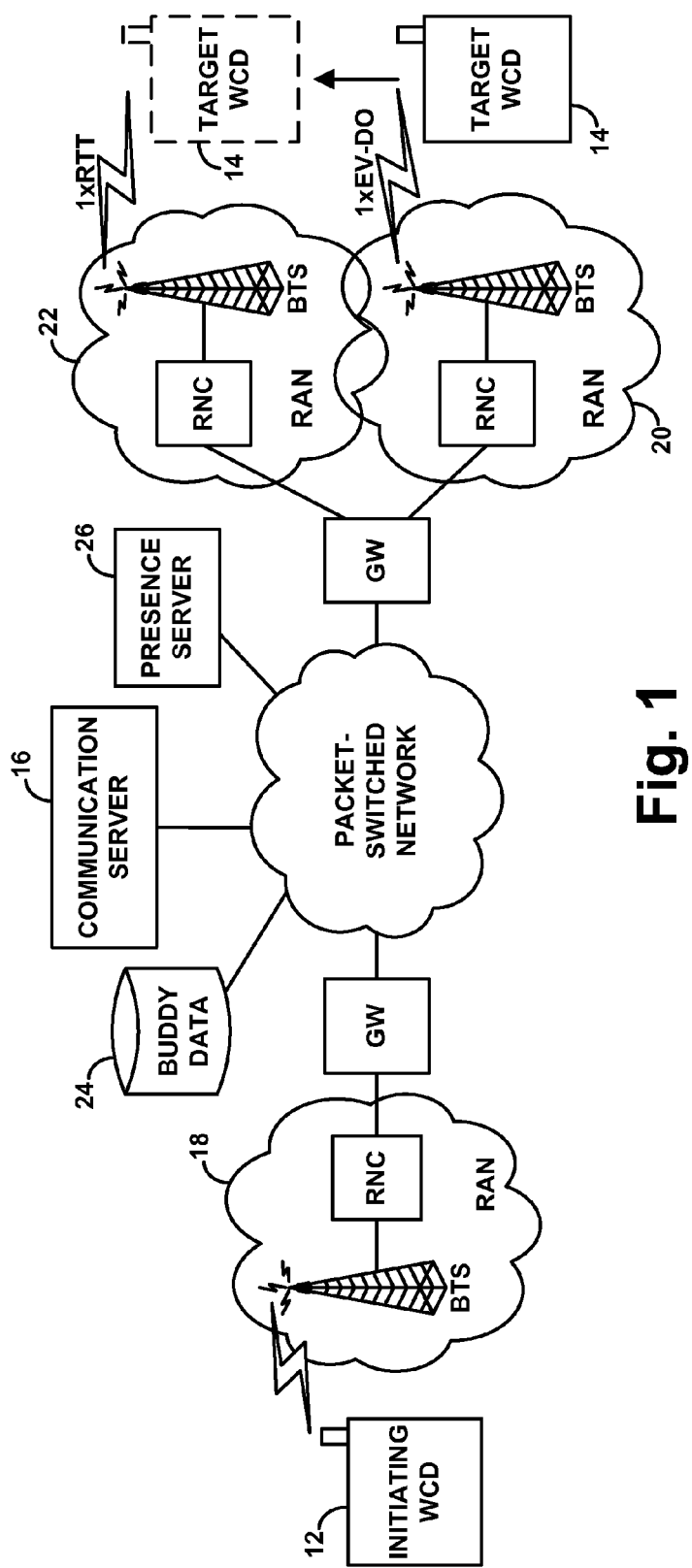
FIG. 1 is a simplified block diagram of an example network in which an exemplary embodiment of the present method can be implemented.

Referring to the drawings, FIG. 1 is a simplified block diagram of an example network in which an initiating device 12 can establish a packet-based real-time media session with a target device 14 through a communication server 16. Although only one target device is shown, the method can be extended to use as well when multiple target devices are being invited to participate in a session.

FIG. 1 depicts the initiating device 12 and target device 14 as wireless communication devices (WCDs), such as cell phones or other mobile or stationary devices that are equipped to engage in wireless communication via a serving radio access network (RAN). In an alternative embodiment, however, the devices could take other forms. For instance, the initiating device 12 could be a landline-connected VoIP phone or other entity arranged to establish packet-based real-time media communication with the target device 14. Further, other variations from the arrangement shown in FIG. 1 are possible as well.

A representative RAN functions to provide its served WCDs with connectivity to one or more transport networks, such as the public switched telephone network (PSTN) and the Internet. As such, the RAN may take any of a variety of forms. By way of example, the RAN may include a base transceiver station (BTS) that radiates to define an air interface coverage area through which a served WCD can communicate with the RAN according to an agreed air interface protocol. The BTS may then be coupled with a radio network controller (RNC) (also referred to as a base station controller (BSC)), which may in turn be coupled with a gateway such as a packet data serving node (PDSN) that provides connectivity with a packet-switched network such as the Internet or a wireless service provider's private packet network.

FIG. 1 shows the initiating device 12 being served by a representative RAN 18 and the target device 14 being served under 1xEV-DO by a representative RAN 20 but moving to be served under 1xRTT by another representative RAN 22. Although these RANs are shown separately in the figure, it will be understood that they could be integrated together or arranged in some other way.

In practice, when a WCD powers on or enters into coverage of a RAN, the WCD may discover that the RAN provides coverage under a particular air interface protocol, and the WCD may initially register with the RAN by transmitting a registration message via an air interface access channel to the RAN. This registration process serves to inform the RAN at least generally where the WCD is located, so that the RAN can subsequently page to the WCD. At this point, the WCD may be "idle," operating in a low-power mode but scanning a paging channel periodically according to a defined slot cycle in order to check for any applicable page messages.

The air interface protocol may define a default paging slot cycle, and the WCD and RAN may both be arranged to operate with that slot cycle in order to facilitate paging of the WCD. Further, the air interface protocol may allow a WCD and RAN to agree on use of a particular slot cycle that may be different than a default slot cycle. In practice, for instance, if the WCD seeks to operate with a shorter slot cycle for one reason or another (such as to facilitate lower-latency operation), the WCD may negotiate with the RAN during a registration process or some other time, to arrange for the WCD and RAN to use that shorter slot cycle. When the WCD and RAN agree on a particular slot cycle to use, both the WCD and RAN (e.g., RNC and/or BTS) may store a record of the slot cycle, and both the WCD and RAN may then operate accordingly.

When a WCD seeks to engage in packet-data communication, perhaps automatically upon registering in a new coverage area, the WCD may engage in signaling to acquire a wireless packet-data connection. For instance, the WCD may transmit an access probe to the RAN, and the RNC may responsively direct the BTS to assign an air interface traffic channel or other radio link connection for use by the WCD. Further, the RNC may signal with the gateway, which may negotiate with the WCD to establish a data link layer connection and may further arrange for assignment of a network address, such as an IP address to the WCD. The WCD may then use the network address to communicate via the RAN with other entities on the packet-switched network.

When there has been no traffic flow to or from a WCD for a threshold period of time, the serving RAN may then release the radio link that had been assigned to the WCD, thus transitioning the WCD to the dormant state. In that state, when the RAN receives packet-data destined to a dormant WCD, the RAN may then page the WCD in accordance with the WCD's paging slot cycle, and, upon receipt of a response from the WCD, may assign a new radio link layer connection to the WCD. The RAN may then transmit the packet-data via that radio link layer connection to the WCD.

Figure 2:
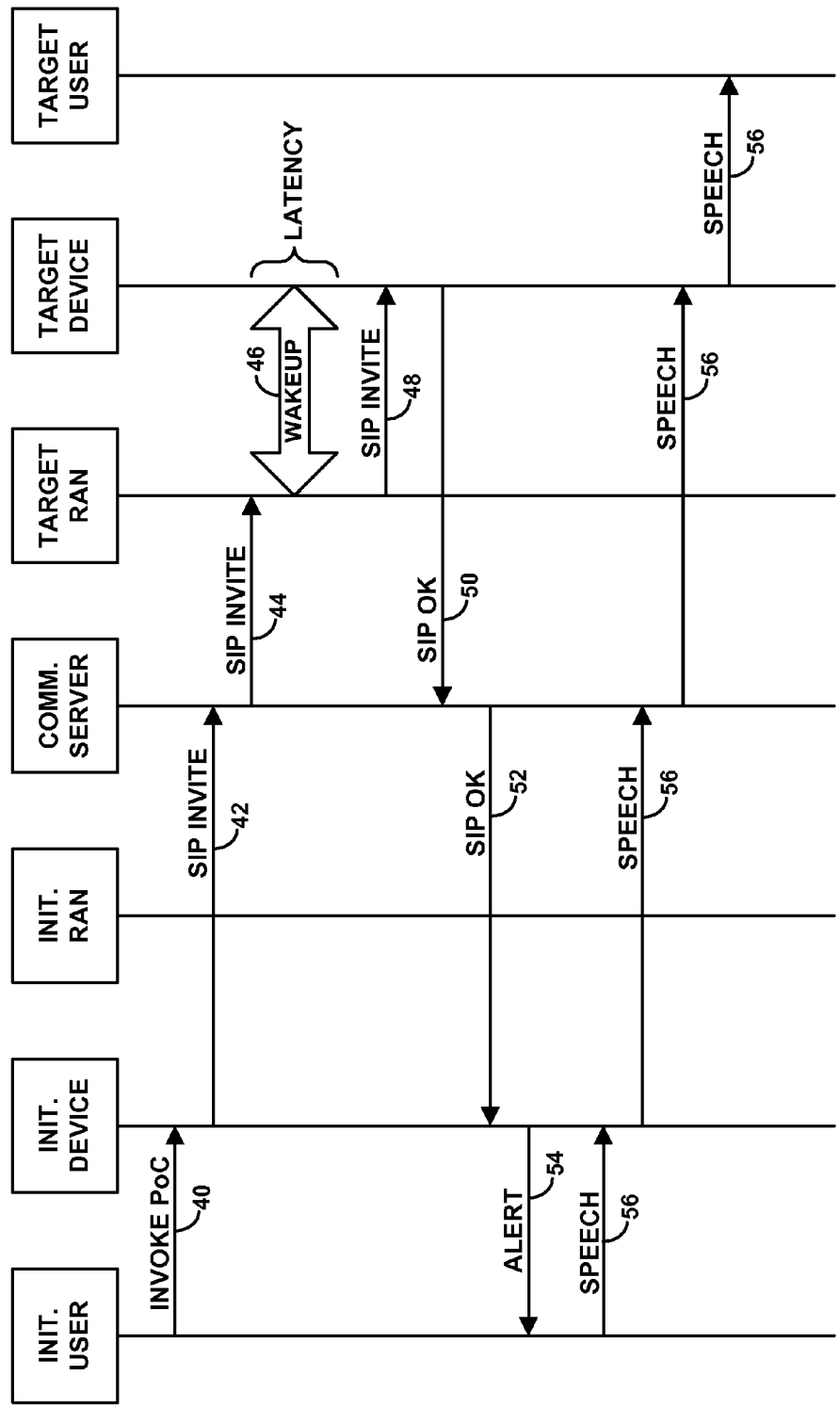
FIG. 2 is a message flow diagram depicting an example normal session setup signaling process.

FIG. 2 is a message flow diagram depicting an example normal signaling process for setting up packet-based real-time media session between initiating device 12 and target device 14 via communication server 16. The message flow omits SIP ACK messaging for simplicity.

As shown in FIG. 2, the process begins when a user of initiating device 12 requests initiation of a session, at step 40. After the initiating device then acquires a wireless packet-data connection if necessary, the initiating device then responsively sends a SIP INVITE to the communication server 16, at step 42. In response, at step 44, the communication server then sends a SIP INVITE to target device 14, and the SIP INVITE arrives at the RAN serving the target device.

In practice, the SIP INVITE sent by the initiating device may itself specify the address (e.g., SIP address or IP address) of the target device, in which case, the communication server may send a SIP INVITE to that address. Alternatively, the SIP INVITE from the initiating device may designate the target by a target identifier of some sort, which may correspond with one or more target devices deemed to be buddies of the initiating device. Upon receipt of such a SIP INVITE, the communication server may then correlate the target identifier with one or more buddy devices and send a SIP INVITE to each such identified target device.

For this purpose, the communication server may include or have access to buddy data 24, which may specify for each of various devices one or more buddy devices. This buddy data may be provisioned by a user, perhaps synchronized from data that a user entered on the user's device, or may be established in some other way. When the server receives from an initiating device a session initiation request, the server may thus refer to the buddy data 24 to identify the target device (or devices) and may then proceed as described above.

At step 46, assuming the target device is currently dormant, its serving RAN next works to wake it up. And at step 48, the serving RAN then transmits the SIP INVITE to the target device.

At step 50, perhaps after alerting the target user, the target device then sends a SIP OK to the communication server. Upon receipt of the SIP OK from the target device, the communication server then sends a SIP OK to the initiating device at step 52. At that point, at step 54, the initiating device then alerts the initiating user to begin talking. And at step 56, the initiating device receives speech from the initiating user, and the speech flows from the from the initiating device to the communication server and, in turn, to the target device, where the speech is played out to the target user.

Figure 3:
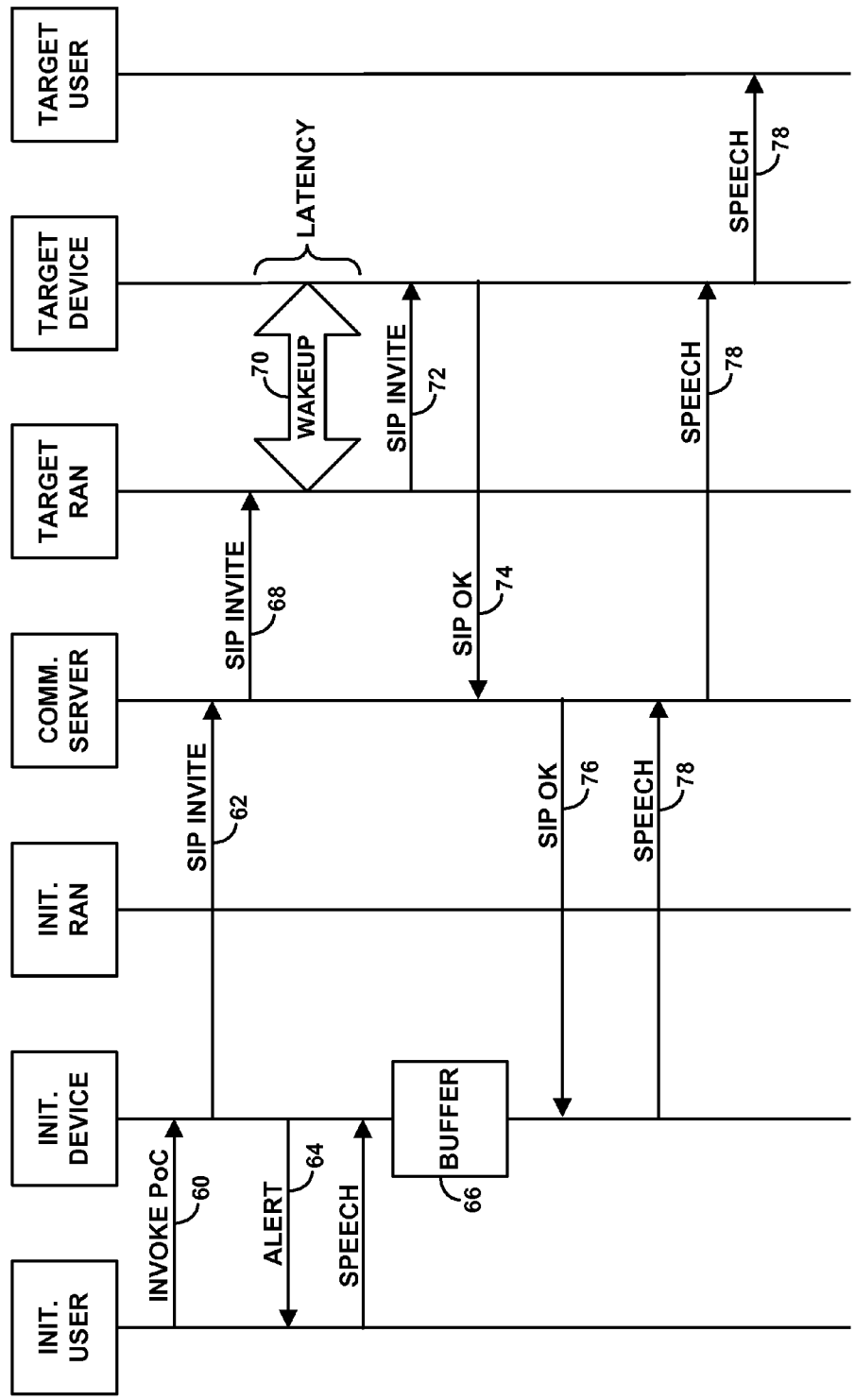
FIG. 3 is a message flow diagram depicting an example optimistic setup process at an initiating device.

FIG. 3 is next a message flow diagram depicting an example optimistic setup mode (optimistic talk permit mode) applied at the initiating device to help mitigate setup latency. Here again, SIP ACK messaging is omitted for simplicity.

As shown in FIG. 3, the process begins when a user of initiating device 12 requests initiation of a session, at step 60. After the initiating device then acquires a wireless packet-data connection if necessary, the initiating device then responsively sends a SIP INVITE to the communication server 16, at step 62. Further, at step 64 (or alternatively before step 62), the initiating device alerts the initiating user to begin talking. And as the initiating device then receives the initiating user's speech, the initiating device buffers the speech at step 66. Meanwhile, when the communication server receives the SIP INVITE from the initiating device, the server sends a SIP INVITE to the target device at step 68, and the SIP INVITE arrives at the RAN serving the target device. At step 70, assuming the target device is currently dormant, its serving RAN works to wake it up. And at step 72, the serving RAN then transmits the SIP INVITE to the target device.

At step 74, perhaps after alerting the target user, the target device then sends a SIP OK to the communication server. Upon receipt of the SIP OK from the target device, the communication server then sends a SIP OK to the initiating device at step 76. At that point, at step 78, the initiating device then begins to transmit the initiating user's buffered speech to the communication server, and the communication server sends the speech along to the target device for playout to the target user.

Figure 4:
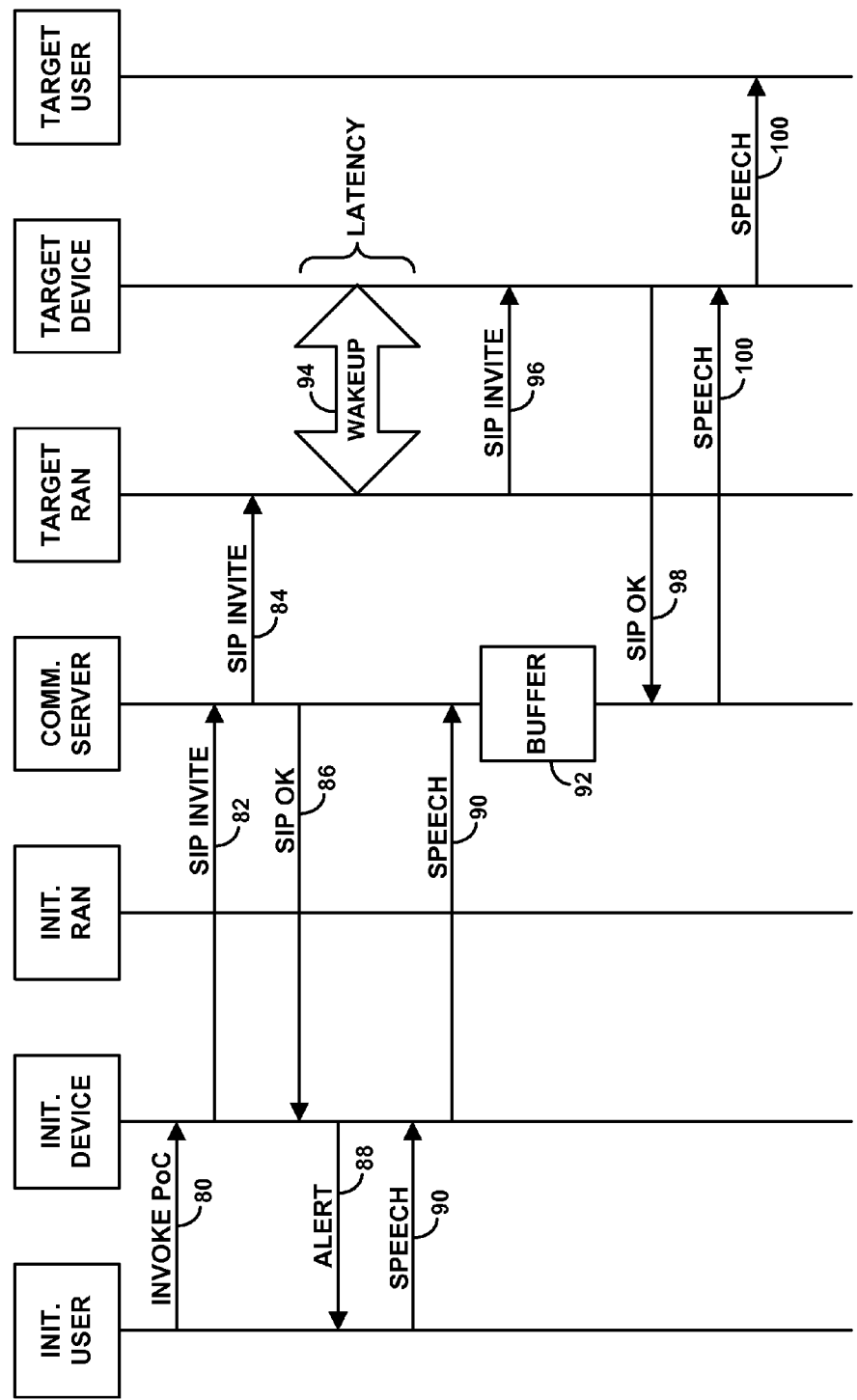
FIG. 4 is a message flow diagram depicting an example optimistic setup process at a communication server.

FIG. 4 is next a message flow diagram depicting an example optimistic setup mode applied at the communication server to help mitigate setup latency. Once again, SIP ACK messaging is omitted for simplicity.

As shown in FIG. 4, at step 80, the process may likewise begin when a user of the initiating device requests initiation of a session. After the initiating device then acquires a wireless packet-data connection if necessary, the initiating device then responsively sends a SIP INVITE to the communication server 16, at step 82. At this point, the communication server sends a SIP INVITE to the target device at step 84 and also (perhaps before step 84) sends a SIP OK to the initiating device at step 86. In response to the SIP OK, at step 88, the initiating device then alerts the initiating user to begin talking, and at step 90, speech flows from the initiating user to the initiating device to the communication server. As the communication server may not yet have a communication session (conference leg) through which to transmit the speech in turn to the target device, at step 92, the communication server then buffers the received speech for later transmission.

Meanwhile, at step 94, the target RAN works to wake up the target device. And after successfully waking up the target device, at step 96, the target RAN sends the SIP INVITE along to the target device. At step 98, perhaps after alerting the target user, the target device then sends a SIP OK to the communication server. Upon receipt of the SIP OK from the target device, at step 100, the communication server then sends the buffered speech along to the target device, where the speech is played out to the target user.

As explained above, the present method provides for selective operation in one setup mode or another depending on latency at the target device. To facilitate this, a latency characteristic of the target device (i.e., of a device that may become a target device) is preferably reported to the initiating device and/or to the communication server, and the initiating device or communication server then uses the reported latency characteristic as a basis to select a setup mode to use when establishing a communication session with the target device. For instance, based on the latency characteristic, the initiating device and/or communication server may decide whether to operate in an optimistic setup mode or in a normal setup mode, and the initiating device and/or communication server may operate accordingly.

The latency characteristic may represent the extent of latency (e.g., wakeup latency) likely to occur at the target device when setting up a communication session with the target device. By way of example, the latency characteristic may be the air interface protocol currently used by the target device and/or the slot cycle currently used by the target device, as these features may tend to impact or directly relate to wakeup latency at the target device as described above. Other latency characteristics can be considered as well or instead.

In practice, the latency characteristic of a WCD such as device 14 can be reported, by various entities, in various ways, and at various times.

By way of example, device 14 itself can report the latency characteristic in response to the device 14 changing a latency state, such as beginning to operate under a particular air interface protocol or with a particular paging slot cycle, whether as initial operation of the device (e.g., upon power on) or through handoff from operation under some other latency state. In the arrangement of FIG. 1, for instance, when device 14 begins to operate in coverage of RAN 20 using 1xEV-DO and a paging slot cycle of 213 milliseconds, device 14 may report its latency characteristic. And when device 14 transitions to operate in coverage of RAN 22 using 1xRTT and a paging slot cycle of 5.12 seconds, device 14 may again report its latency characteristic. Alternatively, as 213 milliseconds may not be significant enough to matter, device 14 may be set to report its latency characteristic only upon moving to 1xRTT coverage and 5.12 seconds, or more generally only in response to the latency characteristic being a particular value or level (e.g., a particular air interface protocol, or a threshold high slot cycle). Similarly, if and when device 14 begins to use a new paging slot cycle, device may report its latency characteristic.

Device 14 can report its latency characteristic directly to each of its established buddy devices, such as device 12 for instance. For example, device 14 can send a report of its latency characteristic in a text message, e-mail message, SIP message, HTTP message, or other type of message to device 12. Likewise, device 14 can report its latency characteristic directly to the communication server 16, similarly by sending to the server a message carrying the latency characteristic. Device 12 and/or communication server 16 may thus receive the reported latency characteristic of device 14 and use the reported latency characteristic as a basis to decide which setup mode to use when setting up a communication session with device 14.

Alternatively, device 14 can report its latency characteristic to a presence server 26 (possibly a function of communication server 16 itself), and the presence server can in turn report the latency characteristic to each buddy device of device 14 and/or to the communication server 16. FIG. 1 depicts a presence server 22 that may facilitate this. In practice, for instance, device 14 may send to the presence server 26 a SIP NOTIFY message (or other presence notification message) specifying the latency characteristic, and the presence server may in turn send to device 12 and/or communication server 16 a SIP NOTIFY message (or other presence notification message) specifying the latency characteristic.

Still alternatively, rather than device 14 itself reporting its latency characteristic for ultimate receipt and use by the device 12 and/or communication server 16, the RAN that serves device 14 could do so. For instance, when device 14 begins to operate under a particular air interface protocol or with a particular slot cycle, the RAN serving device 14 (e.g., the RNC, BTS, or any network entity aware of such operation) may programmatically report the latency characteristic of device 14 to each buddy device of device 14 and/or to communication server 16, in any of the ways discussed above for example.

As still another example, if the communication server 16 has received a report of the latency characteristic of device 14, the communication server can itself report that latency characteristic to buddy device 12 at the time device 12 seeks to initiate a communication session via the server with device 14. For instance, when device 12 sends a SIP INVITE to the communication server 16 seeking initiation of a session with device 14, the communication server can programmatically respond by generating and sending to device 12 an interim SIP response message (perhaps a new message defined for this purpose), specifying in the message the latency characteristic of device 14. (This may occur, for example, between steps 62 and 68 in FIG. 3.) Device 12 may then advantageously make use of that latency characteristic as a basis to decide whether to operate in an optimistic talk permit mode. For instance, if the latency characteristic indicates a latency issue, device 12 may then responsively alert the initiating user to begin talking and so forth as described above.

When a device (i.e., device, platform, combination of devices, combination of servers, or any other arrangement), such as device 12 or communication server 16, receives the report of the latency characteristic of device 14, the recipient device may store the latency characteristic for later reference or may responsively set a flag or other data to indicate what setup mode to use when setting up a communication session with device 14, based on the indicated latency characteristic. When setting up a communication session with device 14, the stored latency characteristic or flag can then be used as a basis to decide what setup mode to use. For instance, in response to the latency characteristic indicating that device 14 is operating with a relatively high latency air interface protocol, an optimistic setup mode may be used. Likewise, in response to the latency characteristic indicating that device 14 is operating with a relatively long slot cycle, an optimistic setup mode may be used. On the other hand, a normal setup mode may be used.

Figure 5:
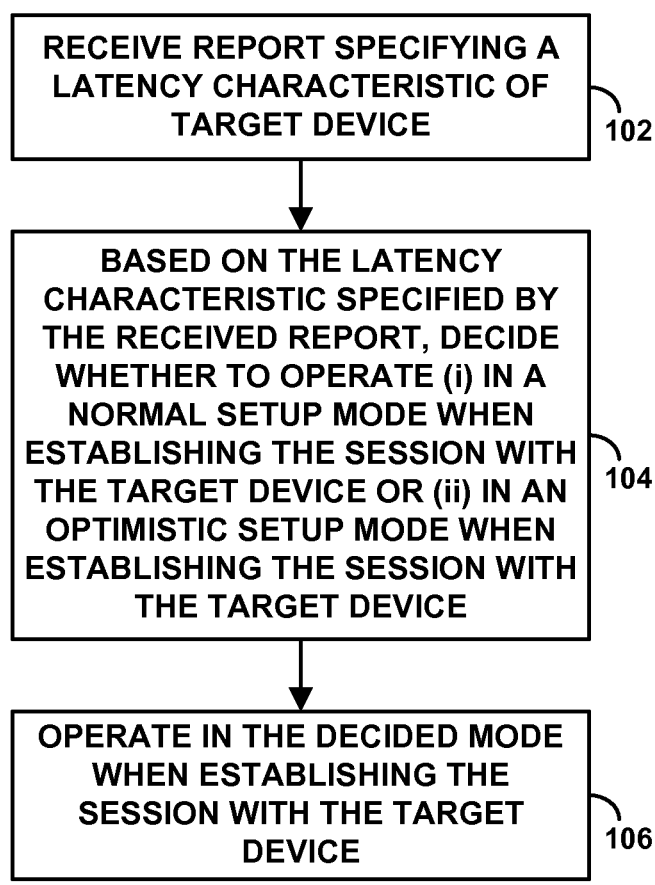
FIG. 5 is a flow chart depicting functions that can be carried out in accordance with the present method.

FIG. 5 is next a flow chart summarizing some functions that can be carried out in accordance with the present method, in a wireless communication system in which a first device establishes a packet-based real-time media session with a second device via a packet-switched network. As shown in FIG. 5, at block 102, the first device receives a report specifying a latency characteristic of the second device, where the latency characteristic represents at least an air interface protocol being used by the second device and/or a paging slot cycle being used by the second device. At block 104, based on the latency characteristic specified by the received report, the first device decides whether to operate (i) in a normal setup mode when establishing the session with the second device or (ii) in an optimistic setup mode when establishing the session with the second device. And at block 106, the first device operates in the decided mode when establishing the session with the second device.

As noted above, the first device may comprise an end-user device operated by a user who will talk in the session, and the act of operating in the decided mode may involve sending a session initiation message to request initiation of the session. In that case, operating in the normal setup mode may involve waiting to receive an acceptance of the sent session initiation message before alerting the user to begin talking Whereas, operating in the optimistic setup mode may involve alerting the user to begin talking before the first device receives an acceptance of the sent session initiation message, and buffering speech received from the user in response to the alerting, for transmission of the speech once the session is set up.

Alternatively, the first device may comprise a communication server that bridges communication between an initiating end-user device and the second device, and the act of operating in the decided mode may involve receiving a first session initiation message from the initiating end-user device and, responsive to the received first session initiation message, sending a second session initiation message to the second device to request initiation of the session. In that case, operating in the normal setup mode may involve waiting to receive from the second device an acceptance of the second session initiation message before sending to the initiating end-user device an acceptance of the first session initiation message. Whereas, operating in the optimistic setup mode comprises sending to the initiating end-user device an acceptance of the first session initiation message without first receiving from the second device an acceptance of the second session initiation message.

Figure 6:
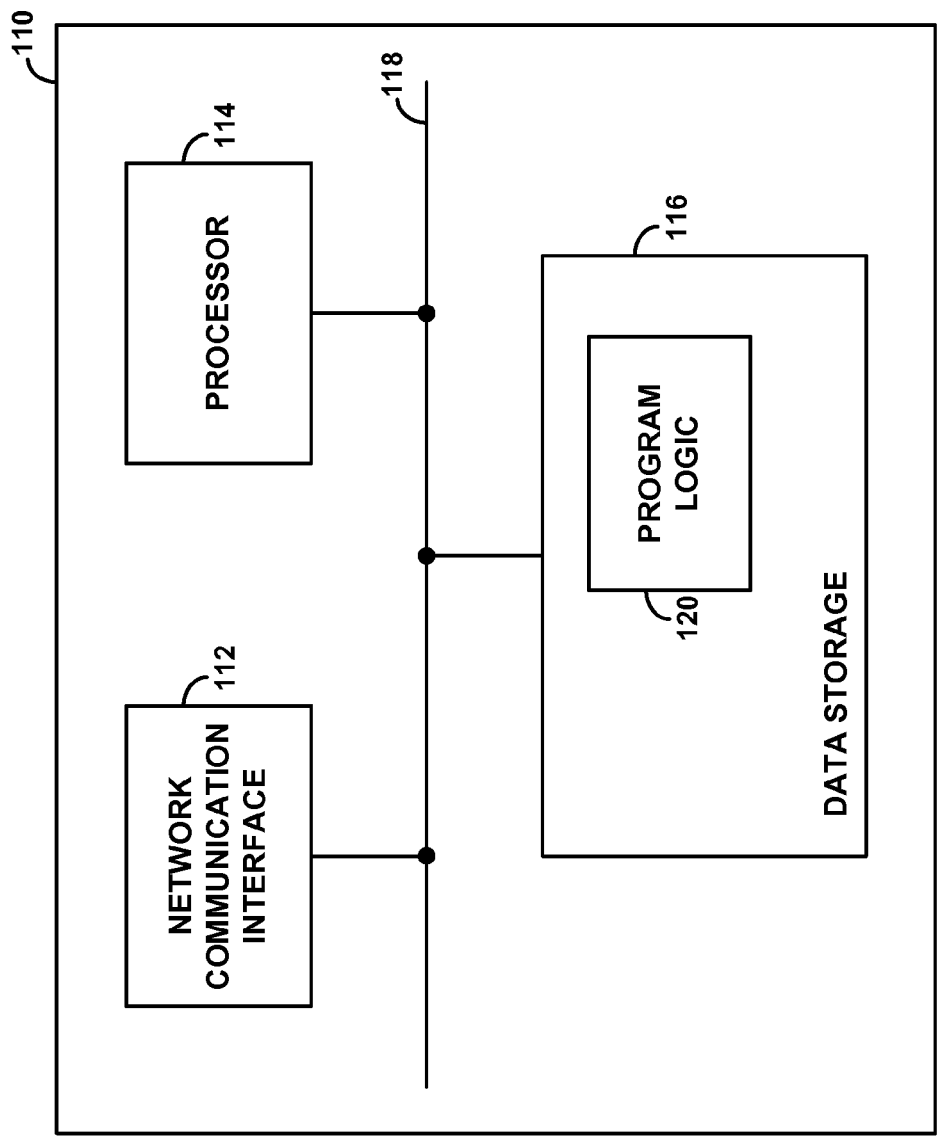
FIG. 6 is simplified block diagram of a communication device that is arranged to carry out functions of the present method.

FIG. 6 is next a simplified block diagram of a communication device 110 that is arranged to manage latency in a wireless communication system in which the communication device establishes a packet-based real-time media session with a target device via a packet-switched network. The communication device 110 of FIG. 3 may be initiating device 12

(which may establish a peer-to-peer or server-based session with the target device for instance) or may be the communication server 16, which may function to establish a communication session in the form of a communication leg between itself and the target device for instance.

As shown in FIG. 6, the example communication device 110 may comprise a network communication interface 112, a processor 114, and data storage 116, all of which may be coupled together by a system bus, network, or other mechanism 118, and which may be integrated together in any of a variety of ways.

Network communication interface 112 enables the device to engage in network communication. As such, the device may comprise a cellular chipset and antenna, a wired or wireless Ethernet connection, or any other type of communication interface now known or later developed.

Processor 114 may comprise one or more general purpose processors (e.g., INTEL processors) and/or one or more special purpose processors (e.g., application specific integrated circuits or digital signal processors) and may be integrated in whole or in part with the communication interface 112. Data storage 116, in turn, may comprise one or more volatile and/or non-volatile storage components, such as magnetic, optical, flash, or other storage, and may be integrated in whole or in part with processor 114.

As shown, data storage includes program logic 120, which is executable by processor 114 to carry out various functions described herein. Alternatively, these functions can be carried out by any combination of hardware, firmware and/or software.

By way of example, the program logic 110 is preferably executable (a) to receive via the network communication interface a report specifying a latency characteristic of the target device (i.e., a device that may become the target device), where the latency characteristic represents at least an air interface protocol being used by the target device and/or a paging slot cycle being used by the target device, (b) based on the latency characteristic specified by the received report, to decide whether the communication device should operate in a normal setup mode when establishing the session with the target device or in an optimistic setup mode when establishing the session with the target device, and (c) to cause the communication device to operate in the decided mode when establishing the session with the target device.

Figure 7:
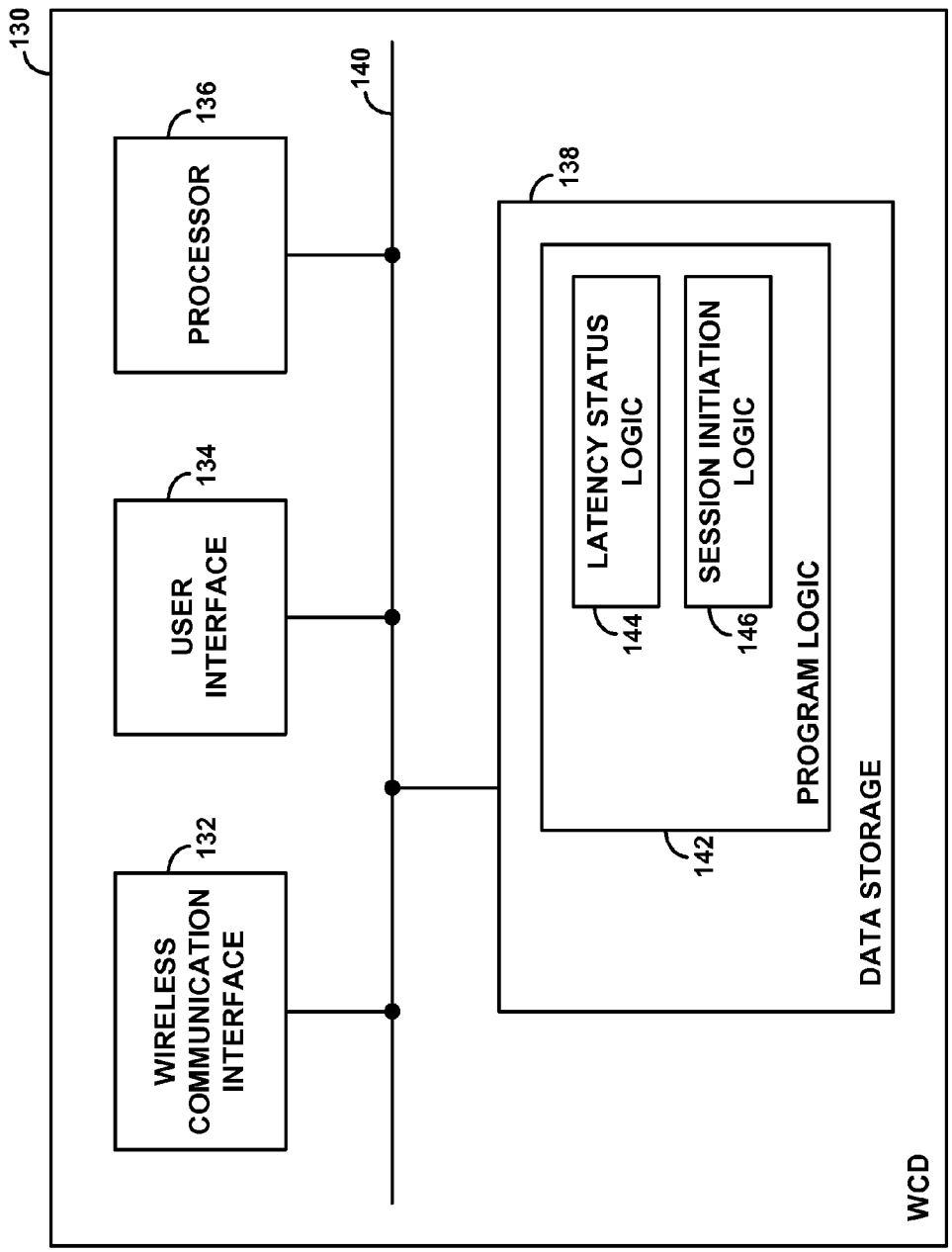
FIG. 7 is a simplified block diagram of a WCD that is arranged to carry out functions of the present method.

FIG. 7 is next a simplified block diagram of a WCD 130 arranged to manage latency in setup of packet-based real-time media communications in accordance with the present method. Such a WCD may be arranged to function at times as initiating device 12 and at other times as target device 14. Thus the WCD may include functions of both.

As shown, the example WCD 130 includes a wireless communication interface 132, a user interface 134, a processor 136, and data storage 138, all of which may be coupled together by a system bus, network, or other mechanism 140, and which may be integrated together in any of a variety of ways.

Wireless communication interface 132 enables the device to engage in air interface communication with a serving radio network according to an agreed air interface protocol, and may support operation according to multiple air interface protocols as noted above. By way of example, the wireless communication interface may comprise a cellular chipset and associated antenna arrangement, of a type now known or later developed.

User interface 134 enables the device to interact with a user, such as to receive user instructions, to receive speech from a user for transmission to another device, and to receive speech from another device and play out the speech to a user. As such, the user interface may include input components such as a keypad, touch-sensitive screen, microphone, and camera, and output components such as a display screen and audio speaker for instance. Further, the user interface may include suitable analog-digital conversion circuitry to facilitate digital communication of speech or other media.

Processor 136 may comprise one or more general purpose processors (e.g., INTEL processors) and/or one or more special purpose processors (e.g., application specific integrated circuits or digital signal processors) and may be integrated in whole or in part with the communication interface 132. Data storage 138, in turn, may comprise one or more volatile and/or non-volatile storage components, such as magnetic, optical, flash, or other storage, and may be integrated in whole or in part with processor 136.

As shown, data storage includes program logic 142, which is executable by processor 136 to carry out various functions described herein. Alternatively, these functions can be carried out by any combination of hardware, firmware and/or software. By way of example, the program logic 142 preferably defines latency status logic 144 and session initiation logic 146.

Latency status logic 144 may be executable by the processor 136 to receive, via the wireless communication interface, a report specifying a latency characteristic of a given device designated as a buddy of the WCD, where the latency characteristic represents at least an air interface protocol being used by the given device and/or a paging slot cycle being used by the given device. Further, the latency status logic may be executable by the processor to publish, via the wireless communication interface, a latency characteristic of the WCD, for transmission in turn to one or more devices, such as a buddy device or a communication server.

Session initiation logic 146, in turn, may be executable by the processor 136, in response to receipt from a user of the WCD of a directive for the WCD to establish a packet-based real-time media session with the given device, to send into a network, via the wireless communication interface, a session initiation message requesting initiation of the session, and to receive from a user of the WCD speech to be transmitted in the session to the given device.

In accordance with the session initiation logic, after receipt of the directive, the processor may normally await receipt of an acceptance of the session initiation message before providing a talk prompt to the user. But in view of the latency characteristic specified by the received report, the processor may instead provide a talk prompt to the user before receiving an acceptance of the session initiation message and the processor buffers speech received from the user in response to the prompt, for subsequent transmission of the buffered speech once the session is set up.

An exemplary embodiment of the present method has been described above. Those of ordinary skill in the art will appreciate that changes can be made to the disclosed embodiment without deviating from the spirit of the invention, which is defined by the claims.

We claim:

1. A method for managing latency in a wireless communication system in which a first device establishes a packet-based real-time media communication session with a second device via a packet-switched network, wherein the first device comprises an end-user device operated by a user who will talk in the session, the method comprising:

the first device receiving a report specifying a latency characteristic of the second device, wherein the latency characteristic represents at least one of an air interface protocol being used by the second device or a paging slot cycle being used by the second device;

based on the latency characteristic specified by the received report, the first device deciding whether to operate (i) in a normal setup mode when establishing the session with the second device or (ii) in an optimistic setup mode when establishing the session with the second device; and the first device operating in the decided mode when establishing the session with the second device, wherein operating in the decided mode comprises sending a session initiation message to request initiation of the session, wherein operating in the normal setup mode comprises waiting to receive an acceptance of the sent session initiation message before alerting the user to begin talking, and wherein operating in the optimistic setup mode comprises alerting the user to begin talking before the first device receives an acceptance of the sent session initiation message, and buffering speech received from the user in response to the alerting, for transmission of the speech once the session is set up.

2. The method of claim 1, wherein receiving the report specifying the latency characteristic of the second device comprises receiving the report before sending the session initiation message.

3. The method of claim 1, wherein receiving the report specifying the latency characteristic of the second device comprises receiving the report in a presence notification message.

4. The method of claim 1, wherein the session extends between the first device and the second device via a communication server, wherein operating in the decided mode comprises sending to the communication server the session initiation message to request initiation of the session, and wherein receiving the report specifying the latency characteristic of the second device comprises receiving the report in a message received from the communication server in response to the session initiation message.

5. The method of claim 4, further comprising:
the communication server receiving the session initiation message from the first device;
the communication server determining the latency characteristic of the second device; and
the communication server generating and sending to the first device the message containing the report.

6. A method for managing latency in a wireless communication system in which a first device establishes a packet-based real-time media communication session with a second device via a packet-switched network, wherein the first device comprises a communication server that bridges communication between an initiating end-user device and the second device, the method comprising:
the first device receiving a report specifying a latency characteristic of the second device, wherein the latency characteristic represents at least one of an air interface protocol being used by the second device or a paging slot cycle being used by the second device;
based on the latency characteristic specified by the received report, the first device deciding whether to operate (i) in a normal setup mode when establishing the session with the second device or (ii) in an optimistic setup mode when establishing the session with the second device; and
the first device operating in the decided mode when establishing the session with the second device,
wherein operating in the decided mode comprises receiving a first session initiation message from the initiating end-user device and, responsive to the received first session initiation message, sending a second session initiation message to the second device to request initiation of the session,
wherein operating in the normal setup mode comprises waiting to receive from the second device an acceptance of the second session initiation message before sending to the initiating end-user device an acceptance of the first session initiation message, and
wherein operating in the optimistic setup mode comprises sending to the initiating end-user device an acceptance of the first session initiation message without first receiving from the second device an acceptance of the second session initiation message.

7. The method of claim 6, wherein receiving the report specifying the latency characteristic of the second device comprises receiving the report in a presence notification message provided by a presence server.

8. The method of claim 6, further comprising:
a server receiving from the second device a notification that the second device has the latency characteristic, and the server responsively transmitting the report to the first device, wherein receiving the report comprises receiving the report transmitted from the server.

9. The method of claim 6, wherein the latency characteristic represents the air interface protocol being used by the second device.

10. The method of claim 6, wherein the latency characteristic represents the paging slot cycle being used by the second device.

11. A communication device arranged to manage latency in a wireless communication system in which the communication device establishes a packet-based real-time media session with a target device via a packet-switched network, wherein the communication device comprises an end-user device operated by a user who will talk in the session, the communication device comprising:
a network communication interface;
a processor;
data storage; and
program logic stored in the data storage and executable by the processor (a) to receive via the network communication interface a report specifying a latency characteristic of the target device, wherein the latency characteristic represents at least one of an air interface protocol being used by the target device or a paging slot cycle being used by the target device, (b) based on the latency characteristic specified by the received report, to decide whether the communication device should operate in a normal setup mode when establishing the session with the target device or in an optimistic setup mode when establishing the session with the target device, and (c) to cause the communication device to operate in the decided mode when establishing the session with the target device,
wherein operating in the decided mode comprises sending a session initiation message to request initiation of the session,
wherein operating in the normal setup mode comprises waiting to receive an acceptance of the sent session initiation message before alerting the user to begin talking, and
wherein operating in the optimistic setup mode comprises alerting the user to begin talking before the first device receives an acceptance of the sent session initiation message, and buffering speech received from the user in response to the alerting, for transmission once the session is set up.

12. The communication device of claim 11, wherein receiving the report specifying the latency characteristic of the target device comprises receiving the report before sending the session initiation message.

13. The communication device of claim 11, wherein the session extends between the communication device and the target device via a communication server, wherein operating in the decided mode comprises sending to the communication server the session initiation message to request initiation of the session, and wherein receiving the report specifying the latency characteristic of the target device comprises receiving the report in a message received from the communication server in response to the session initiation message.

14. A communication device arranged to manage latency in a wireless communication system in which the communication device establishes a packet-based real-time media session with a target device via a packet-switched network, wherein the communication device comprises a communication server that bridges communication between an initiating end-user device and the target device, the communication device comprising:
a network communication interface;
a processor;
data storage; and
program logic stored in the data storage and executable by the processor (a) to receive via the network communication interface a report specifying a latency characteristic of the target device, wherein the latency characteristic represents at least one of an air interface protocol being used by the target device or a paging slot cycle being used by the target device, (b) based on the latency characteristic specified by the received report, to decide whether the communication device should operate in a normal setup mode when establishing the session with the target device or in an optimistic setup mode when establishing the session with the target device, and (c) to cause the communication device to operate in the decided mode when establishing the session with the target device, wherein operating in the decided mode comprises receiving a first session initiation message from the initiating end-user device and, responsive to the received first session initiation message, sending a second session initiation message to the target device to request initiation of the session, wherein operating in the normal setup mode comprises waiting to receive from the target device an acceptance of the second session initiation message before sending to the initiating end-user device an acceptance of the first session initiation message, and wherein operating in the optimistic setup mode comprises sending to the initiating end-user device an acceptance of the first session initiation message without first receiving from the target device an acceptance of the second session initiation message.

15. The communication device of claim 14, wherein the latency characteristic represents the air interface protocol being used by the target device.

16. The communication device of claim 14, wherein the latency characteristic represents the paging slot cycle being used by the target device.

17. A wireless communication device (WCD) arranged to manage latency in setup of packet-based real-time media communications, the device comprising:
a wireless communication interface;
a processor;
data storage;
latency status logic stored in the data storage and executable by the processor to receive, via the wireless communication interface, a report specifying a latency characteristic of a given device designated as a buddy of the WCD, wherein the latency characteristic represents at least one of an air interface protocol being used by the given device or a paging slot cycle being used by the given device; and
session initiation logic stored in the data storage and executable by the processor, in response to receipt from a user of the WCD of a directive for the WCD to establish a packet-based real-time media session with the given device, to send into a network, via the wireless communication interface, a session initiation message requesting initiation of the session, and to receive from a user of the WCD speech to be transmitted in the session to the given device,
wherein, in accordance with the session initiation logic, after receipt of the directive, (a) the processor normally awaits receipt of an acceptance of the session initiation message before providing a talk prompt to the user, but (b) in view of the latency characteristic specified by the received report, the processor instead provides a talk prompt to the user before receiving an acceptance of the session initiation message and the processor buffers speech received from the user in response to the prompt, for subsequent transmission of the buffered speech once the session is set up.

18. The WCD of claim 17, wherein the latency status logic is further executable by the processor to publish to the network server, via the wireless communication interface, a latency characteristic of the WCD, for transmission in turn to one or more devices.

* * * * *